UNITED STATES PATENT OFFICE.

PROSPER MONNET, OF LYONS, FRANCE.

IMPROVEMENT IN PRODUCING ANILINE COLORS.

Specification forming part of Letters Patent No. 36,356, dated September 2, 1862.

*To all whom it may concern:*

Be it known that I, PROSPER MONNET, of Lyons, in the Empire of France, have invented a new and Improved Process of Producing Violet-Blue from the Red of Aniline; and I do hereby declare that the following is a full, clear, and exact description of the same.

This invention consists in treating the red of aniline with methylene or wood-spirit, and afterward with nitric acid, until the color has changed from the red to a beautiful violet-blue.

To enable those skilled in the art to fully understand and use my invention, I will proceed to describe it.

In twelve (12) parts of methylene or wood-spirit one part of the red of aniline (rosaniline) is dissolved, and after the solution is complete one part of nitric acid is added, imparting at the same time to the mixture a violent agitation. Soon after the introduction of the nitric acid the red assumes a tinge more and more violet-blue, and after the lapse of three days the transformation is complete. The best methylene for this purpose, and that which gives the best results, is such which dims water most when mixed with it, and by using such methylene a violet-blue is obtained which has but a very slight hue of purple. In order to separate the violet-blue which is in solution in the methylene, ten parts of water are added to one part of the solution. The violet soon precipitates, and after having been washed with pure water the product is rendered perfectly pure and ready for use. This color can be used for painting and for printing textile fabrics, paper, &c., and in order to render it fit for use it is dissolved in alcohol, or in methylene, or in acetic acid. Dilute sulphuric acid, particularly when hot, dissolves it very easy, and without changing the beauty of the color.

Having thus fully described my invention, what I claim as new, and desire to secure by Letters Patent, is—

The within-described process of treating the red of aniline with methylene or wood-spirit and nitric acid, substantially in the manner and for the purpose set forth.

PROSPER MONNET.

Witnesses:
 LOUIS WM. VIOLLIER,
 N. MONNET.